3,119,743
ALKALI METAL MONOFLUOROPHOSPHATE AND CALCIUM CARBONATE DENTIFRICE
Sten Yngve Ericsson, Urdavagen 7, Djursholm, Sweden
No Drawing. Filed Aug. 4, 1960, Ser. No. 47,383
Claims priority, application Sweden Aug. 7, 1959
6 Claims. (Cl. 167—93)

The invention relates to dentifrices containing fluorine, and it is particularly concerned with toothpastes containing calcium carbonate or another alkaline earth metal carbonate as abrasive. It is known in the art that a local treatment of the tooth surfaces with fluorides, for instance painting them with solutions of sodium fluoride, has a caries inhibiting effect. This effect depends with certainty on the absorption of fluorine in the surface of the tooth enamel which makes the calcium salts of the enamel more resistant against dissolution by weak acids. In order that such local supply can be made more regularly and independently of professional personnel it has been suggested to incorporate fluorine compounds into toothpastes. In certain such products on the market sodium fluoride has been used. However, clinical tests made with toothpastes of that kind, which have conventionally contained calcium carbonate or calcium phosphate as a polishing agent, have in practically all cases given negative results. Furthermore the toxicity of sodium fluoride cannot be disregarded.

It has been ascertained through investigations made by the present inventor that fluorine is taken up from a solution containing sodium fluoride very rapidly by calcium carbonate as well as by different calcium phosphates. The most plausible explanation for the failure of the toothpastes referred to above is therefore that fluorine is bound to and inactivated by the calcium salts contained in the pastes.

With tin (II) fluoride, $SnF_2$, it is true, a considerable caries preventing effect has been obtained in several clinical tests with toothpastes containing as polishing agent calcium pyrophosphate or heated tricalciumphosphate. This composition, however, is very unstable and in order to be effective it must have such a low pH value that it becomes unstable. Another disadvantage is that the tin absorbed by the tooth surface can form brownish black discolouring sulphides with hydrogen sulphide.

One object of the invention is to provide a dentifrice containing fluorine in a form which can be satisfactorily absorbed by the enamel of the tooth and has a relatively low toxicity. Another object is to provide a toothpaste satisfying the said object also in the presence of alkaline earth metal carbonates, and especially calcium carbonate which is the best established and most commonly used polishing agent in toothpastes. A still further object is to provide a dentifrice effective in desensibilizing sensitive tooth surfaces, such as denuded surfaces of dentine or cementum.

To obtain these objects and other valuable advantages, which will be understood from the following description, the invention resides primarily in employing as fluorine supplying substance an alkali metal monofluorophosphate, preferably sodium monofluorophosphate, $Na_2PO_3F$. It has been found that fluorine is absorbed by the tooth enamel and dentine from an aqueous solution of sodium monofluorophosphate. In animal tests it has been found that this complex fluorine compound has about the same caries inhibiting effect as sodium fluoride at normal dosage, and at higher dosage is only 40% as toxic as the latter when compared on an equi-molar basis.

For the investigations forming the basis of the present invention the inventor has used fluorine compounds labeled with the radioactive fluorine isotope F18, which makes possible a rapid and exact analysis of minute quantities of fluorine. The inventor has found that monofluorophosphate, just as sodium fluoride, can be mixed with such abrasives as silica and, if water soluble pastes are wanted, with sodium bicarbonate to form useful dentifrices. Such compositions may be used by the dentist in desensibilizing tooth necks and polishing tooth surfaces while at the same time reducing their solubility. Furthermore the inventor has found that calcium phosphate commonly used in toothpastes as polishing agent absorbs fluorine from solution containing the $PO_3F$-ion approximately in the same degree as from solutions containing sodium fluoride, i.e., the F-ion. This holds good whether tricalciumphosphate (hydroxy apatite) or calcium pyrophosphate is used and whether these phosphates are used in a freshly precipitated form or after storage or heating to 900° C. It has also been found that calcium carbonate absorbs fluorine from sodium fluoride solutions in about the same degree as hydroxy apatite and calcium pyrophosphate.

Contrary to expectation it has now been found that calcium carbonate does not absorb fluorine at all from sodium monofluorophosphate solutions. Even a 1-molar solution of sodium monofluorophosphate does not loose any of its fluorine by shaking for half an hour with an amount of calcium carbonate equal to about ⅓ by weight of the solution. A suitable form of calcium carbonate is precipitated chalk.

Experiments have further demonstrated that the viscosity increasing agent, carboxymethyl cellulose and the detergent, sodium lauryl sulphate—both commonly used in toothpastes—can be added without any risk of binding or otherwise inactivating the fluorine of the monofluorophosphate. Also glycerol, sorbitol and soap, may be used in the pastes for usual purposes but as detergent the lauryl sulphate is preferred.

With regard to the quantitative composition of a toothpaste containing monofluorophosphate it should be observed that the percentage of fluorine should be as high as possible without involving the risk that toxic quantities may be swallowed. The maximum percentage may be estimated as follows. Assuming that the fluorine quantity tolerable is 1 milligram per day and the individual consumption of toothpaste is at the most 1.5 grams per day, not more than 20% of which being swallowed at the tooth brushing, a maximum percentage of 2.5% $Na_2PO_3F$ in the toothpaste is obtained. Most certainly this dosage could be exceeded at least three times for decades without doing any harm.

The amount of abrasive may be that usually used in toothpastes, for example 50–60% by weight. It may also be considerably reduced if a suitable viscosity is attained by carboxymethyl cellulose.

As examples of toothpastes according to the present invention the following compositions—to which the invention is not restricted—may be mentioned.

Example 1

| | G. |
|---|---|
| Sodium monofluorophosphate | 0.2 |
| Calcium carbonate | 3.5 |
| Carboxymethyl cellulose | 0.2 |
| Sodium lauryl sulphate | 0.3 |
| Aetheroleum menthae piperitae | 0.2 |
| Aetheroleum anisi | 0.025 |
| Sodium saccharinate | 0.005 |
| Water | 7 |

Example 2

| | |
|---|---|
| Sodium monofluorophosphate | 0.2 |
| Calcium carbonate | 5 |
| Glycerol | 1.5 |
| Carboxymethyl cellulose | 0.15 |
| Aetheroleum menthae piperitae | 0.2 |
| Aetheroleum anisi | 0.025 |
| Sodium saccharinate | 0.005 |
| Water | 4.5 |

Example 3

In the Examples 1 and 2 the abrasive is calcium carbonate, which is insoluble. In case a water soluble paste is wanted the calcium carbonate of said examples may be replaced by about 6 g. of sodium bicarbonate.

Example 4

A composition suitable for treating painfully sensible tooth neck surfaces may have the following formula:

| | G. |
|---|---|
| Sodium monofluorophosphate | 2 |
| Calcium carbonate | 10 |
| Carboxymethyl cellulose | 0.2 |
| Sodium lauryl sulphate | 0.8 |
| Glycerol | 5 |
| Aetheroleum menthae piperitae | 0.4 |
| Aetheroleum anisi | 0.05 |
| Sodium saccharinate | 0.01 |
| Water | 10 |

Since in this case the composition is to be used by the dentist in small quantities and only occasionally, the percentage of sodium monofluorophosphate is considerably higher than in the Examples 1-3 which enhances the efficacy without involving any toxicity risks.

What is claimed is:

1. A dentifrice consisting essentially of a mixture of an alkali metal monofluorophosphate as fluorine donor, calcium carbonate as abrasive and a paste base.

2. A dentifrice as defined in claim 1 in which the alkali metal monofluorophosphate is sodium monofluorophosphate.

3. A dentifrice consisting essentially of a mixture of an alkali metal monofluorophosphate as fluorine donor, calcium carbonate as abrasive and a paste base containing carboxymethyl cellulose as gelatinizing agent.

4. A dentifrice consisting essentially of a mixture of an alkali metal monofluorophosphate as fluorine donor, calcium carbonate as abrasive and a paste base comprising a polyhydric alcohol selected from the group consisting of glycerol and sorbitol.

5. A dentifrice consisting essentially of a mixture of an alkali metal monofluorophosphate as fluorine donor, calcium carbonate as abrasive and a paste base comprising lauryl sulfate.

6. A dentifrice consisting essentially of a mixture of an alkali metal monofluorophosphate as a fluorine donor and calcium carbonate as abrasive.

References Cited in the file of this patent

FOREIGN PATENTS

| 217,073 | Australia | Oct. 25, 1956 |
| 205,803 | Australia | Feb. 1, 1957 |

OTHER REFERENCES

Jahoda: The Literature of Inorganic Fluorides, December 1, 1954, page 143.

Science News Letter, July 6, 1957, page 6.